Oct. 27, 1925.
P. J. WILLIAMS
1,558,958
AIRPLANE CONSTRUCTION
Filed May 14, 1923  4 Sheets-Sheet 3
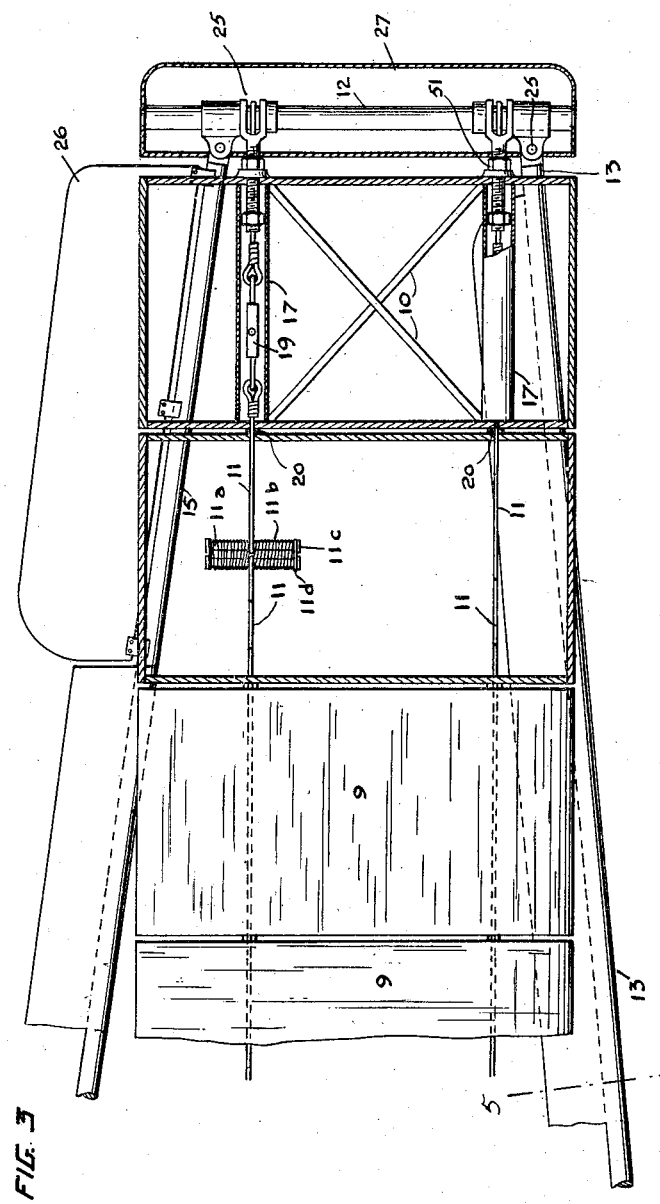
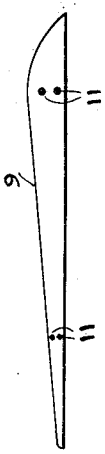
INVENTOR
P. J. WILLIAMS
ATT'YS.

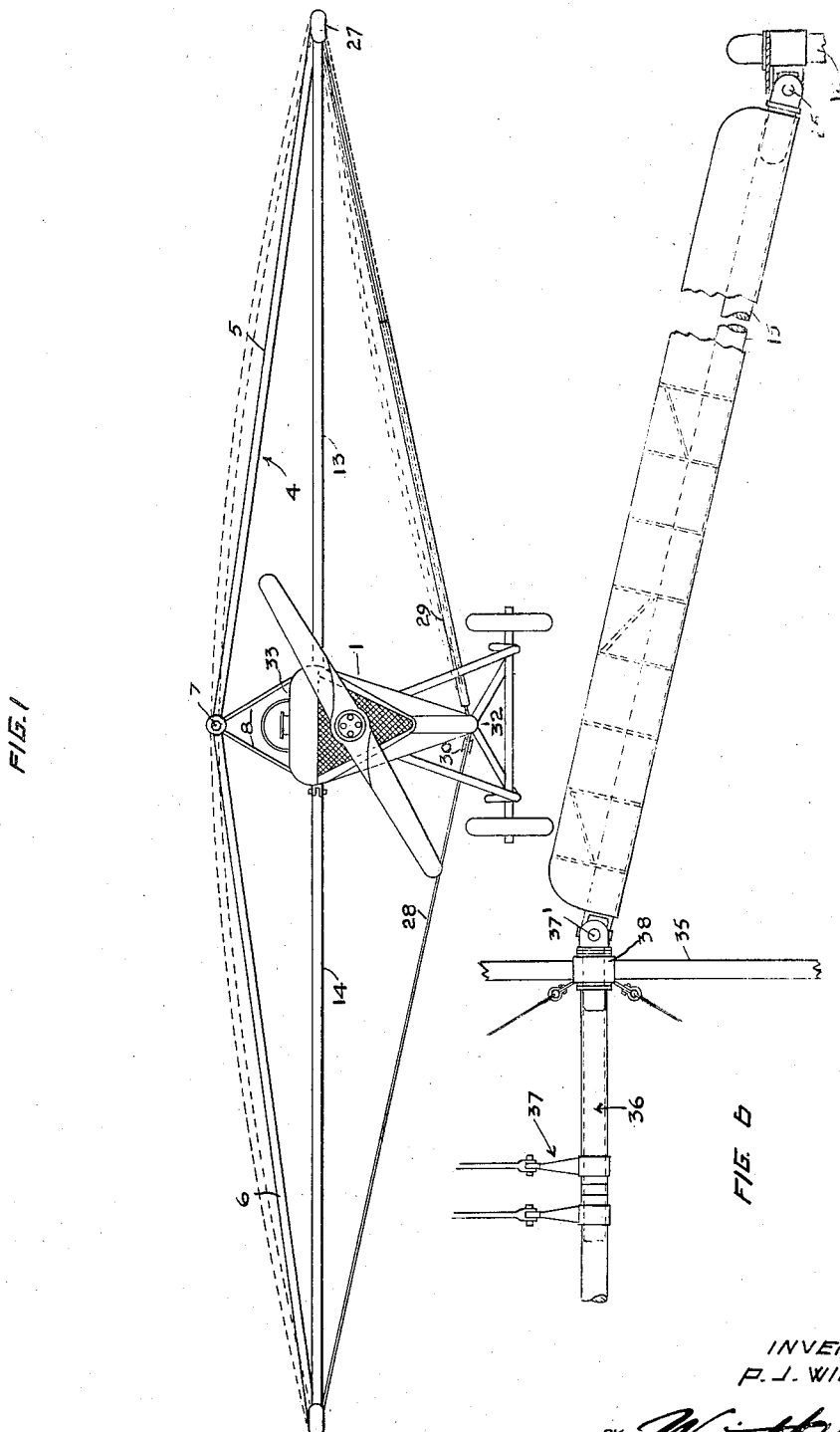

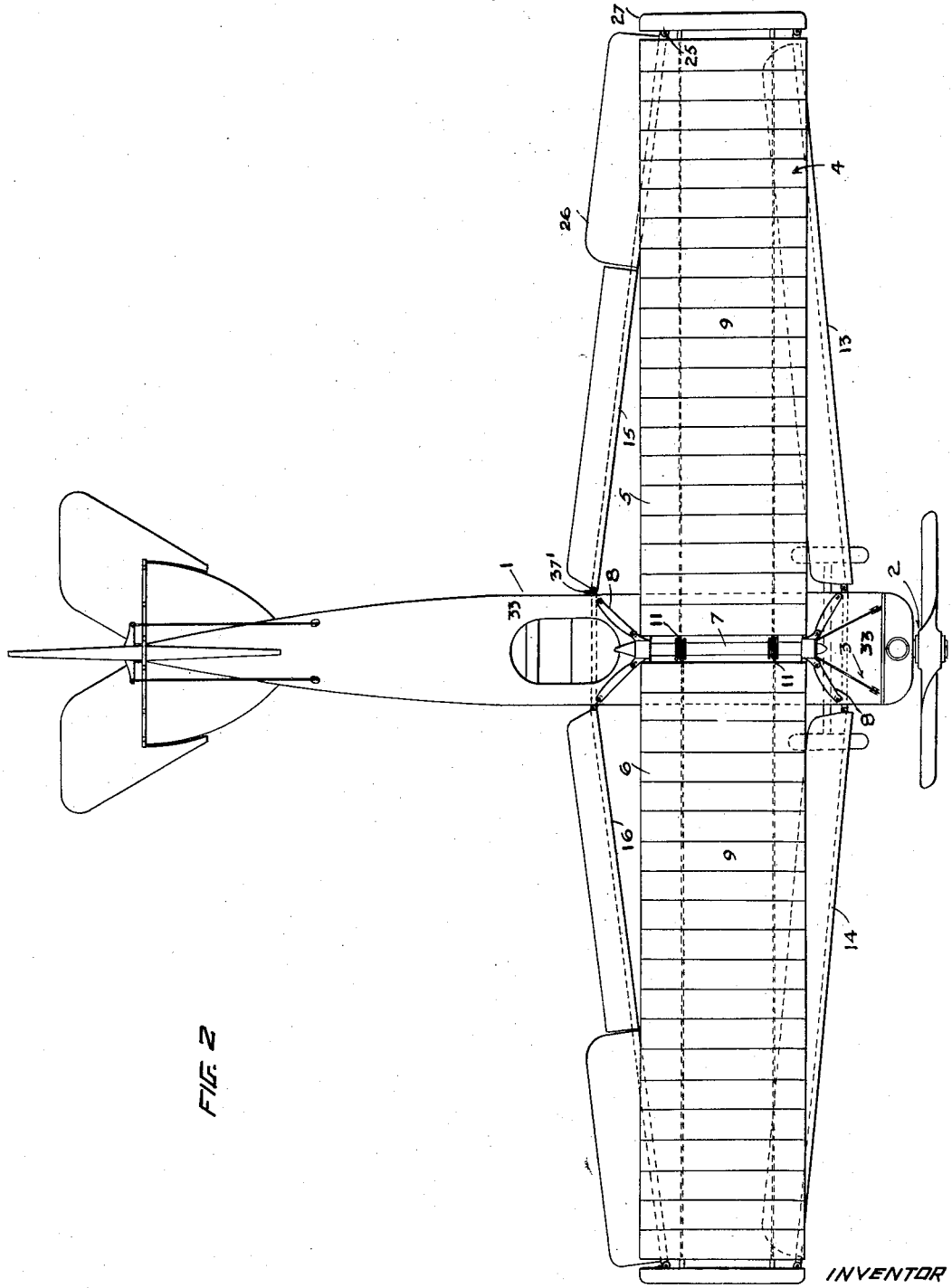

Oct. 27, 1925.
P. J. WILLIAMS
1,558,958
AIRPLANE CONSTRUCTION
Filed May 14, 1923    4 Sheets-Sheet 4
FIG. 7
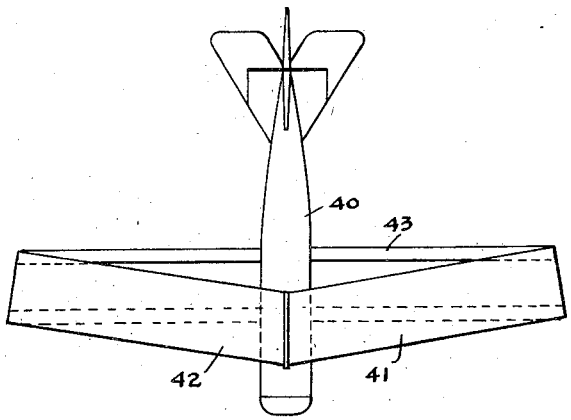
FIG. 8
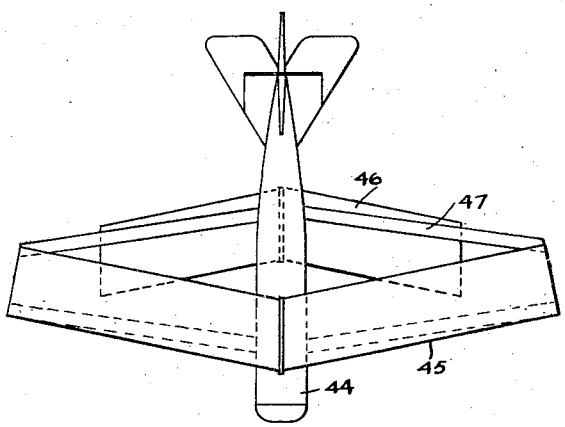
FIG. 9
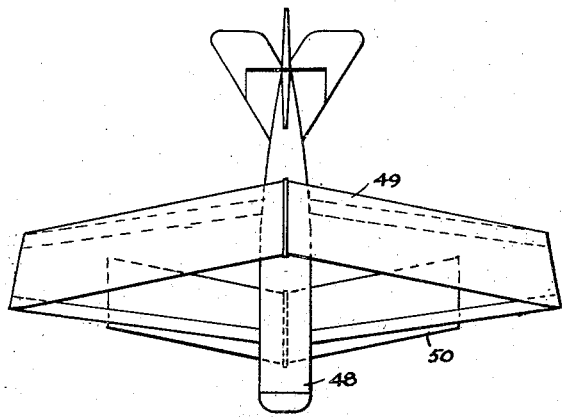
FIG. 10
INVENTOR
P. J. WILLIAMS
BY
ATT'YS.

Patented Oct. 27, 1925.

1,558,958

UNITED STATES PATENT OFFICE.

PERCY J. WILLIAMS, OF SAN FRANCISCO, CALIFORNIA.

AIRPLANE CONSTRUCTION.

Application filed May 14, 1923. Serial No. 638,780.

*To all whom it may concern:*

Be it known that I, PERCY J. WILLIAMS, a citizen of the United States, residing at San Francisco, in the county of San Francisco and State of California, have invented new and useful Improvements in Airplane Construction, of which the following is a specification.

This invention relates to improvements in airplanes and more particularly to the construction, relative arrangement and association of the wings and their associated elements.

Another object of the invention is to provide a wing construction which will permit of flexibility to the extent of producing a lateral curve under flying pressure so as to increase the efficiency of the wing as to its lifting propensities, the flexibility being provided for without sacrificing strength, and without adding weight to the structure.

Another object of the invention is to provide a wing construction which will permit of an aerofoil of different sizes, from comparatively thin to comparatively thick wing sections, without in either case, sacrificing strength or any of the advantages derived from the construction.

Another object of the invention is to provide airplane wing construction in which, instead of having the rigid main beams supporting the load, the wing is made up of a plurality of independent wing sections held in assembled relation by flexible elements, said wings being supported by struts extending outwardly from the sides of the fuselage to the outer ends of the wing thereby providing for the desirable wing flexibility without sacrificing strength or limiting the construction of the wing to a comparatively thick cross section.

Another object of the invention is to provide for the use of the main wing supporting means or struts to assist in the lifting and controlling of the airplane, it being possible to construct these struts with lifting wing-curves and to provide for their movement also, whereby control may be effected, both without detracting from their efficiency as bracing elements.

Another object is to provide a construction whereby a monoplane constructed in accordance with the invention may be readily and easily converted into a biplane without materially changing the construction and relative arrangement of the parts and elements of the entire structure.

Another object is to provide an airplane construction which will eliminate the necessity of employing the vertical struts, flying and landing wires or other bracing wires such as ordinarily employed in airplanes, the functions of these wires being provided for in the four substantially horizontal struts which are attached to the extremities of one wing and to opposite sides of the fuselage.

A further object of the invention is to provide wing construction in which, by forming the wings of a plurality of independent sections there will be provided between the sections slots or spaces which will increase the efficiency of the wing, in one instance by decreasing the usual side loss of the air stream.

A further object of the invention is manifested in the sectional wing construction through the employment of which it is apparent that assembling and disassembling of the wing may be readily and easily provided for and the removal and replacement of damaged or broken sections effected without requiring the complete disassembling of the structure.

Another object of the invention is to provide in the sectional construction, a safety arrangement comprising a plurality of flexible elements such as cables for holding of the sections in assembled positions, certain of which cables will be made to take the load while the others are put under less tension whereby upon breaking or derangement of the cables in operation, the other of the cables will be caused to take the load and maintain the wing in assembled position.

Another object of the invention is to provide a flexible wing of the character described having means whereby an angle of incidence may be varied readily and easily and without building up or changing the construction of the wing as is required in the ordinary airplane wing construction.

A further object of the invention is to provide a flexible wing construction of the character described which will not only increase the efficiency of the airplane as to the lifting propensities but adds considerably and provides for an easy control and at the same time permits of a much lighter airplane construction, as a whole, than is possible with the ordinary type of airplane.

Another object of the invention is to provide a wing construction of the character described wherein the wings may be set so as to range forwardly or rearwardly and in the case of a biplane, the upper and lower wings may be set to range at opposite angles, the lower wings ranging forwardly and outwardly from the body or fuselage or vice versa, in either instance without sacrificing strength and lifting propensities and with the provision of added stability.

The flexible sectional wing construction of this invention provides for a general improvement in airplane construction particularly in that the plane is less subject to severe damage and breakage in falling to the ground and in other accidents or collisions.

With the above mentioned and other objects in view, the invention consists in the novel connstruction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings:

Fig. 1 represents a front elevation of an airplane constructed in accordance with my invention; Fig. 2 represents a top plan view of the construction of the airplane of the invention; Fig. 3 represents an enlarged fragmentary plan view, showing in section, one of the wing sections and illustrating the manner of attaching the flexible wing securing elements; Fig. 4 represents a side elevation of one of the wing sections; Fig. 5 represents a cross sectional view taken on the line 5—5 of Fig. 3; Fig. 6 is a fragmentary top plan view of one of the struts showing the manner of mounting the same; Fig. 7 is a top plan view showing the particular arrangement of the wings; Fig. 8 is a top plan view showing another particular arrangement of wings; Fig. 9 is a top plan view showing a still different arrangement of the wings; Fig. 10 is a sectional view of a wing showing the angle of incidence to the line of flight, the arrow indicating the plane of the line of flight.

The airplane shown in the accompanying drawing is constructed in accordance with one embodiment of the invention and comprises a fuselage or main frame 1 provided with the usual running gear 2 and control elements generally designated 3. The fuselage is of special design in keeping with the purpose of the present invention as will be later more fully described.

My invention deals particularly with the construction of the wings and the arrangement of the wings as to their mounting and association with the fuselage or main frame. As shown in the drawings, there is provided an upper wing 4 which is composed of two sections 5 and 6, extending from opposite sides of the fuselage, each of which sections is identically constructed and extends from a bar 7 supported above the fuselage by braces 8. The wing sections 5 and 6 are made up of a plurality of smaller sections 9, each of which is of rectangular outline and may be braced in any suitable manner, one way being by use of the crossed diagonal braces 10. These sections may be provided with wing curves of any suitable design and may be of any thickness, it being possible to construct them either very thick or very thin, without sacrificing strength or depriving the wing of any of the desired qualities. The wing sections 9 are secured to one another by flexible elements or cables 11, which extend transversely of and preferably through the sections, but may be otherwise attached thereto, if desired. The ends of the cables are attached to the bar 7 and to corresponding bars 12, which latter are supported at the outer ends of the wing by substantially horizontal struts 13, 14, 15 and 16. The struts extend from the sides of the fuselage substantially horizontally and convergently and at their outer ends support said bars 12. The sections 9 defining the outer ends of the wing have tubular members 17 mounted thereon through which the members 11 extend. Turn buckles 19 are associated with the flexible elements whereby the said elements may be tightened as desired. Any suitable means for securely fastening the ends of the cable to the bars 7 and 12 may be employed. Between the wing sections are spacing members 20 which provide crevices or slots between the sections, these crevices being desirable in the wing construction in order to increase efficiency of the wing, for instance, by reducing side loss of the wind currents and to increase the vacuum of the upper surface. These crevices or slots also provide for relative movement of the sections and permit of the flexing of the entire wing so that the right and left sections of the wing may assume, each of them, a definite curve under flying pressure and thereby increase the efficiency of the wing as a whole. The cables or flexible elements 11 are spaced from the centers and end portions of the wing sections so as to effectively support them in even position. Instead of employing one cable, I may, as shown, employ a plurality of cables. Certain of the cables, for instance, the ones 11$^a$ may be under greater tension than the others, whereby, in the event of breaking strains being transmitted thereto and the tighter cables break, the other cables would tend to hold the wing in assembled position.

The wings are so arranged that they extend outwardly and downwardly, that is converge with the struts, so as to obtain effective supporting and bracing of the wings through the use of substantially horizontal struts. These struts 13, 14, 15 and 16, may be constructed with suitable wing curves and made comparatively wide as compared to the ordinary struts so that they will function as small wings and assist in the lifting action of the wings. The inner ends of the struts are preferably attached to the sides of the fuselage by a double swivel or pivot arrangement 37', which will permit not only of a horizontal but a free turning movement of the struts on their axis, and this double pivot arrangement as at 25, is provided to connect the outer ends of the struts with the bars 12. By this arrangement the struts may be also moved so as to serve as controlling elements similar to ailerons. It is believed unnecessary to illustrate any means for providing for movement of the struts in this manner since various control means as common to airplane construction, may be resorted to.

The ailerons 26 are mounted on the outer extremities of the struts 15 and 16 and these may be controlled by the usual operating means, not shown. The bars 12 at the ends of the wing are provided with streamline coverings 27 producing terminal wing sections.

Extending from the bars 12 downwardly and inwardly to the bottom of the fuselage are pairs of wires or cables 28 and 29. These cables are parallel to one another and spaced apart corresponding with the flexible elements, or cables 11. The inner ends of these cables are attached by suitable means 30 to the lower sides of the fuselage. These cables provide the necessary bracing action to assist in supporting the wing in proper position. When it is desired to provide the lower wing in order to provide a biplane, these cables may be employed as are the cables 11 to hold together the wing sections as shown in Fig. 1. It is only necessary to disconnect the cables at certain ends and to mount them on the wing sections in such manner as the upper wing construction shown in Fig. 3, and to then again attach the disconnected ends of the cable. The lower wings will be flexible and be permitted to curve laterally under flying pressure, as well as the upper wings.

The fuselage is peculiarly shaped, its general cross sectional shape being triangular but it is tapered from the largest central portion 32 on its lower side toward its front and rear ends and on its upper side is mounted or streamlined as at 33. This shape and design of the fuselage will contribute to a successful fuselage construction which will be very strong without requiring any bracing such as is required in the square or rectilinear cross sectional fuselage.

In Fig. 6 I have shown in detail a means for mounting the struts wherein 35 designates one of the longitudinal structures or longerons of the main frame or fuselage, which member 35 carries tubular shafting 36 to which is attached control means 37, the association of the control means with the tubular shafting being such that when the control means is operated, the shafting will move to turn the toggle joint connection 37' between the struts and bearing member 38 supported by the member 35. By means of this toggle joint, the strut may swing rearwardly and forwardly and also turn on its axis so as to serve as an aileron. Various other methods of mounting the strut and provide for movement of the strut to assist in controlling the airplane may be resorted to.

It will be noted that the wing converges towards its outer end with respect to the outer ends of the struts and that the wing as indicated in Fig. 10, is set at an angle of incidence to the line of flight. Provision is made for readily and easily varying the angle of incidence through the turn buckles 19 and their associated elements. By tightening certain of the turn buckles and loosening others, curvatures may be produced which will be of a permanent nature and provide for varying incidences of the wing, as desired. Ordinarily in providing for varying incidences in airplane construction, it is necessary to build up wing structures and this is time consuming and costly, by comparison with the present method wherein it will be seen that no change in construction is necessary to provide for the varying incidences.

Due to the flexible construction of the wings and the arrangement thereof with respect to the main body, it will be seen that the wings may curve rearwardly and forwardly, that is fore and aft, under flying pressure as well as laterally. This is advantageous in that it provides the desirable flexibility and consequent relief of severe strains and increase the stability and lifting capacity. This with the provision of a flexibility wing having a definite form which will curve laterally, and fore and aft under flying pressure, will prove quite desirable in airplane construction in increasing the flying efficiency of airplanes.

As shown in Figs. 7 to 9 inclusive, the planes or wings may be arranged to range forwardly and outwardly or rearwardly and outwardly, instead of at right angles to the main body of the fuselage, and whether in the form of a monoplane or multiplane construction.

In Fig. 7 I have shown an airplane which comprises a fuselage or main body 40 having the usual associated elements and provided with a wing, the wing sections 41 and 42 of which range outwardly and rearwardly and provide a substantially V-shaped wing. Struts 43 of which there are preferably four, are attached to the main side of the body of the fusilage and extend outwardly and at their outer ends are connected with the outer ends of the wing sections, the wing sections will converge with the struts towards their outer ends, and otherwise the arrangement will be the same as in the previously described form of the invention. The same flexible wing construction is followed out in this type, the only difference being the disposition or angularity of the wing section, which in certain plane construcions may prove desirable.

In Fig. 8 I have shown a biplane construction comprising a main body or fuselage 44, with upper and lower wings 45 and 46. The upper wings are attached to the main body at a point forwardly of the point of attachment of the lower wings and extend outwardly and rearwardly, whereas, the lower wings extend outwardly and forwardly, said wings converging towards their outer ends and being supported by the four struts 47, which extend substantially horizontally from the sides of the main body or fuselage.

In Fig. 9, the airplane comprises a main body or fuselage 48, in which the upper wing 49 is set at a point on the main frame or fuselage rearwardly of the lower wing 50, the upper wing extending forwardly and outwardly and the lower wing, outwardly and rearwardly. In this form, the wing construction and arrangement is substantially the same as in the other forms of the invention. The flexible wing construction and manner of mounting the same, it will be seen provides for a variety of wing arrangements, certain of which are illustrated in Figs. 7 to 9 inclusive and in certain airplane constructions, these various wing arrangements may prove desirable.

In an airplane constructed in accordance with the invention the lower wing may either extend outwardly to a point even with the outer end of the upper wing as shown in dotted lines in Fig. 1, or may be cut off at an intermediate point as shown in full lines in said figure, so that in the latter case a space is provided beneath the upper wing where the wings are close together to prevent the lower wings from interfering with the upper wing, particularly as would take place in vertical drops, in which instances the full sustaining propensities of both wings is desired.

As a means for cushioning shocks and relieving strains imposed upon the wings under certain conditions of flying, I provide in association with the flexible means 11$^a$, a yielding device to provide the cushioning effect mentioned. This device may comprise two bars mounted parallel to one another and to which the flexible element 11 is attached, preferably at the centers of the bars. A rubber cord 11$^b$ such as now employed in airplane construction is wrapped several times around the bars and may be fastened in such manner that said cord will yield when the bars are pulled away from one another. Washers 11$^c$ are mounted on the end of the bars to hold the cord from slipping out of place to prevent the bars from pulling apart. In case the cord breaks, I provide safety links 11$^d$ surrounding the bars, the size of the rubber cord and the number of wrappings will determine the cushioning action. The device may be made so that it will not give or yield unless a load of, for example, 2000 pounds is placed thereon, but will yield if strains of more than 2000 pounds are placed thereon. Preferably there will be one of these devices interposed between the ends of each flexible element.

By tightening the nuts 51 the wing sections will be forced together so that the structure may be securely held assembled. Thus, it will be seen, that the flexibility and rigidity of the wing, may be varied or regulated by these nuts.

I claim:

1. In an airplane, a flexible wing capable of curving bodily laterally under flying pressure and means for holding the said wing at an angle of incidence to the line of flight.

2. In an airplane, a flexible wing having a definite form and which will curve bodily laterally under flying pressure.

3. In an airplane, a flexible wing having a definite form and which will curve bodily laterally under flying pressure and fore and aft.

4. An airplane embodying in its construction a main frame, a flexible wing associated with the main frame and arranged to curve bodily laterally under flying pressure and struts connected with the main frame and supporting said wing at an angle of incidence to the line of flight.

5. An airplane embodying in its construction a main frame, a flexible wing connected with the main frame and comprising a plurality of wing sections capable of movement relative to one another, means connecting said sections together and means attached to the main body and said wing for supporting the wing.

6. In an airplane, a flexible wing composed of a plurality of sections relatively movably connected with one another and means for connecting the sections in such manner as to permit the wing to form a curve laterally under flying pressure.

7. An airplane comprising a main frame, a flexible wing composed of a plurality of wing sections mounted one along side of the other throughout the length of the wing, struts extending from the main frame to points adjacent the outer extremities of the wing and flexible members connected with the main frame and said struts and having connection with each of the wing sections to hold the latter assembled.

8. An airplane embodying in its construction a main frame, a flexible wing comprising a plurality of wing sections, struts attached to the main frame and extending outwardly therefrom to points adjacent the extremities of the wing and elements extending lengthwise of the wing connected with the main frame and struts holding the sections of the wing in assembled relation.

9. In an airplane comprising a plurality of wing sections mounted in slightly spaced relation to one another and providing a plurality of transverse slots and means of flexible connection between the wing sections.

10. In an airplane, a wing embodying a plurality of sections mounted one next to the other in slightly spaced relation to one another to provide a plurality of slots and flexible elements extending transversely of said sections and maintaining the sections in assembled relation.

11. An airplane embodying in its construction a main frame, struts extending from the main frame, flexible members connected with the struts and said main frame and a plurality of wing sections connected with said flexible elements.

12. An airplane embodying in its construction a main frame, struts extending from the main frame, flexible members connected with the outer extremities of said struts and said main frame, a plurality of wing sections connected with said flexible elements and lifting surfaces on said struts.

13. An airplane including in its construction a main frame, struts extending from the main frame and being capable of movement relative to the latter, flexible elements connected with the main frame and the struts and a plurality of wing sections comprising a wing connected with said flexible elements.

14. An airplane including in its construction a main frame, struts extending from the main frame and being capable of movement relative to the latter, flexible elements connected with the main frame, and struts and a wing supported by said flexible elements and lifting surfaces of said struts.

15. An airplane including a main frame, struts extending from the main frame, a plurality of flexible members extending from points of connection with the main frame and being connected with the struts, a plurality of wing sections supported and maintained in assembled relation by said flexible elements and arranged in slightly spaced relation to one another providing a plurality of transverse slots.

16. In an airplane a main frame, struts extending from the main frame, means of connection between the struts and main frame providing for movement of the struts relative to the frame, flexible members connected with the main frame, means of connection between said flexible members and said struts and a wing comprising a plurality of independent wing sections connected with said flexible elements.

17. In airplane embodying in its construction a main frame, struts extending outwardly from opposed sides of the main frame, the struts on each side converging towards their outer ends, flexible members connected with the main frame, means of connection between said flexible elements and said struts and a flexible wing comprising a plurality of wing sections connected with said flexible members.

18. In an airplane, a flexible wing comprising a plurality of non-flexible wing sections mounted one along side of the other and flexible elements to which said sections are connected, there being no means of rigid connection between the sections.

19. An airplane comprising a main frame, struts extending outwardly from the main frame and having lifting surfaces, a bodily flexible wing attached to the main frame, and means of connection between the wing and said struts.

20. An airplane embodying in its construction a main frame, struts extending from the main frame and a wing made up of a plurality of independent wing sections, the sole means of connection between which sections constitutes flexible elements connected with said struts and said main frame.

21. An airplane comprising a main frame, struts extending outwardly from the main frame, a flexible wing connected with the main frame and with said struts, lifting surfaces provided on said struts and means of connection between said struts and the main frame permitting the turning of said struts on their axes.

22. An airplane comprising a main frame, struts extending outwardly from the main frame, a flexible wing connected with the main frame and with said struts, lifting surfaces provided on said struts and means of connection between said struts and the main frame permitting the turning of said struts on their axes and swinging of said struts.

23. An airplane comprising a main frame, a wing comprising a plurality of fore and aft wing sections, flexible members connected with the sections and struts extending outwardly from the main frame and having means of connection with said flexible members.

24. An airplane comprising a main frame, a wing connected with the main frame and constructed to flex and produce a lateral curve under flying pressure, struts extending outwardly from the main frame and supporting the outer ends of said wing and means of connection between the struts and main frame permitting swinging movement of said struts.

25. An airplane comprising a main frame, struts extending from the main frame, members carried on the main frame and at the outer ends of said struts, flexible members connected with and extending between said members and a plurality of fore and aft wing sections supported by the flexible members and comprising a wing.

26. An airplane comprising a main frame, struts extending from the main frame, members carried on the main frame and at outer ends of said struts, flexible members connected with and extending between said members and a plurality of fore and aft wing sections supported by the flexible members and comprising a wing, said struts having lifting surfaces and serving as auxiliary wings.

27. An airplane comprising a main frame, struts extending from the main frame, members carried on the main frame and at outer ends of said struts, cables connected with and extending between said members, a plurality of fore and aft wing sections supported by the cables and comprising a wing, said struts having wing surfaces and serving as auxiliary wings and means of connection between the struts and main frame permitting movement of the struts.

28. An airplane comprising a fuselage, a pair of struts attached to each side of and extending outwardly and convergently from the fuselage, flexible members extending between and fastened to said frame and struts, and a wing comprising a plurality of independent sections connected with and supported in position by said flexible members.

29. An airplane comprising a fuselage, a pair of struts attached to each side of and extending outwardly and convergently from the fuselage, flexible members extending between and fastened to said frame and struts, a wing comprising a plurality of independent sections connected with and supported in position by said flexible members, and additional flexible members extending downwardly and inwardly from the outer ends of said struts to the lower part of the fuselage, which flexible members are capable of supporting right and left wing sections corresponding to the main wing sections.

30. In an airplane a main frame, struts extending from the frame and a bodily flexible wing of a definite form, said wing and struts converging towards their outer ends.

31. An airplane main frame, a bodily flexible wing and means holding the wing at an angle of incidence to the line of flight including struts connected with the main frame and wing towards the outer end of which struts the wing converges.

32. In an airplane a main frame or body and a bodily flexible wing attached to the body with sections thereof extending angularly with respect to the longitudinal axis of the main frame or body and struts extending outwardly from the body and connected with the outer extremities of the wing sections.

33. An airplane comprising a main frame, struts extending outwardly from the main frame, flexible elements connected with the struts and main frame and a plurality of wing sections attached to the flexible elements and comprising a flexible wing arranged in a substantially V-shape.

34. An airplane comprising a main frame, struts extending outwardly from the main frame, an upper flexible wing and a lower flexible wing, said wing being attached at spaced points on the main frame or body and extending outwardly from the main frame or body at opposed angles, both perpendicularly and horizontally, and means of connection between said wings and the struts.

35. In an airplane a main frame, struts extending from the main frame, flexible elements connected with the main frame and struts, wing sections flexibly connected with the flexible element and resilient means associated with the flexible elements arranged to yield when strains or loads beyond a predetermined point are imposed upon the flexible element.

36. In an airplane a main frame, struts extending from the main frame, a flexible wing connected with and held in position by the flexible members and struts and means associated with the flexible elements arranged to yield when excessive strains are imposed upon the wing to prevent breakage of or damage to the latter.

37. In an airplane a main frame, struts extending from the main frame, flexible elements connected with the struts and main frame, a plurality of wing sections associated with the flexible elements and struts comprising a flexible wing, and means associated with the flexible elements arranged to yield when damaging strains are imposed upon the wing and flexible elements.

PERCY J. WILLIAMS.